US011206547B1

(12) United States Patent
Rasool et al.

(10) Patent No.: US 11,206,547 B1
(45) Date of Patent: Dec. 21, 2021

(54) CONTIGUOUSLY CLUSTERING OF RESOURCE ALLOCATION IN RESPONSE TO NEAR-FREQUENCY COMMUNICATION WITH DIFFERENT SUBCARRIER SPACING

(71) Applicant: Sprint Spectrum L.P., Overland Park, KS (US)

(72) Inventors: Shahzada Rasool, Ashburn, VA (US); Noman M. Alam, Chantilly, VA (US); Nagi Mansour, Arlington, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 102 days.

(21) Appl. No.: 16/599,916

(22) Filed: Oct. 11, 2019

(51) Int. Cl.
| | |
|---|---|
| *H04W 16/14* | (2009.01) |
| *H04W 72/04* | (2009.01) |
| *H04L 5/00* | (2006.01) |
| *H04L 27/26* | (2006.01) |
| *H04W 92/10* | (2009.01) |

(52) U.S. Cl.
CPC ........... *H04W 16/14* (2013.01); *H04L 5/0082* (2013.01); *H04L 5/0094* (2013.01); *H04L 27/2607* (2013.01); *H04W 72/0453* (2013.01); *H04W 92/10* (2013.01)

(58) Field of Classification Search
CPC ..................................................... H04W 16/14
See application file for complete search history.

(56) References Cited

U.S. PATENT DOCUMENTS

| | | | |
|---|---|---|---|
| 2018/0091267 A1* | 3/2018 | Kim | .................... H04L 27/2602 |
| 2018/0278386 A1* | 9/2018 | Shim | ................... H04W 72/042 |
| 2019/0246387 A1* | 8/2019 | Lee | ..................... H04W 72/046 |
| 2019/0357239 A1* | 11/2019 | Moon | ................... H04L 5/0007 |
| 2019/0357264 A1* | 11/2019 | Yi | ........................... H04L 5/001 |
| 2020/0305189 A1* | 9/2020 | Yoon | ................... H04W 74/085 |
| 2020/0382354 A1* | 12/2020 | Sengupta | ............... H04L 5/005 |
| 2021/0105107 A1* | 4/2021 | Khirallah | .......... H04W 72/0426 |

FOREIGN PATENT DOCUMENTS

| | | |
|---|---|---|
| EP | 3 300 324 | 3/2018 |
| EP | 3 454 497 | 3/2019 |

* cited by examiner

*Primary Examiner* — Jason E Mattis (57) ABSTRACT

When access nodes provide collocated service on overlapping carriers with different subcarrier spacing than each other, at least one of the access nodes could be configured to cluster its respective allocation of air-interface resources at an end of the frequency-overlap region, and a single guard band could then separate that clustered resource allocation from the remainder of the frequency-overlap region in which the other access node could allocate resources. In an example implementation for instance, the access nodes could be configured to cluster their respective concurrent allocation of resources at different respective ends of the frequency-overlap region so as to help maximize frequency width between transmission in the frequency-overlap region on one of the carriers with one subcarrier spacing and transmission in the frequency-overlap region on the other carrier with the other subcarrier spacing.

20 Claims, 9 Drawing Sheets

CONTIGUOUSLY CLUSTERING OF RESOURCE ALLOCATION IN RESPONSE TO NEAR-FREQUENCY COMMUNICATION WITH DIFFERENT SUBCARRIER SPACING

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that may provide connectivity with various application servers and/or transport networks, such as the public switched telephone network (PSTN) and/or the Internet for instance. With this arrangement, a UE within coverage of the cellular network could engage in air interface communication with an access node and may thereby communicate via the access node with various application servers and/or other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of radio access technologies, in a continuous effort to increase available data rate and quality of service. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And more recently, the industry has been exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use. Each such frequency channel could have a respective bandwidth centered on a respective center frequency, defining a respective range of frequency extending from a low-end frequency to a high-end frequency.

Further, on the downlink and uplink respectively, the air interface defined by each carrier under an example RAT could be structured over time and frequency to define physical air-interface resources for carrying information between the access node and UEs.

Without limitation for instance, the air interface could be divided over time into frames, which can be divided in turn into subframes, timeslots, and symbol time-segments. And the carrier bandwidth (frequency width of the carrier on the downlink and/or uplink) could be divided over frequency into subcarriers. As a result, the air interface could define an array of resource elements per subframe, each occupying a respective subcarrier and spanning a respective symbol time segment, and the subcarrier of each such resource element could be modulated using an applicable modulation scheme to carry data over the air. Further, the air interface could be configured to group these resource elements into physical resource blocks (PRBs) across the carrier bandwidth, and the access node could be configured to allocate some or all of these PRBs for use to carry data on an as-needed basis.

OVERVIEW

A representative RAT may support carriers with frequency channels having various bandwidths. For example, LTE supports carriers having bandwidths of 1.4 MHz, 3 MHz, 5 MHz, 10 MHz, 15 MHz, and 20 MHz, among other possibilities, and 5G NR supports carriers having similar bandwidths as well as carriers having different and potentially much smaller or much wider bandwidths.

In practice, an access node could be configured to provide service on one or more such carriers. To facilitate this, a wireless service provider that owns, operates, or controls the access node could acquire a license for radio frequency (RF) spectrum where appropriate and could configure the access node to operate on the carriers within that licensed spectrum. For instance, the service provider could configure the access node with one or more filters and/or other radio equipment to limit its communication to particular spectrum and could configure the access node to engage in downlink and uplink communication to define the carriers within that spectrum in accordance with an applicable RAT.

In a representative implementation, an access node could broadcast a synchronization signal at the center of the downlink channel of each such carrier, and UEs could scan for and discover the broadcast of that synchronization signal as an indication that the access node provides service on a carrier centered at that frequency. Further, the access node could broadcast on the carrier a master information block (MIB) or the like that specifies the downlink bandwidth of the carrier centered on that frequency and, if applicable, the associated uplink bandwidth and frequency range of the carrier. Thus, a UE that has discovered the synchronization signal could then read that MIB as way to determine the carrier bandwidth. And the UE could then engage in signaling to connect with and be served by the access node on that carrier.

For various reasons, however, a wireless service provider may face a situation where one of its access nodes will provide service on a carrier of a particular bandwidth and frequency range and the service provider would also like to have another access node provide collocated service on a carrier that either partly or fully overlaps in frequency with the first carrier on the downlink and/or uplink. The collocated service in this situation might be where the two access nodes are located in a common cell site and provide areas of coverage in a similar direction and of similar scope.

By way of example, this situation might occur where the service provider will configure a cell site with a 4G LTE access node (e.g., evolved Node-B (eNB)) to provide 4G service on one carrier (a 4G carrier) and with a 5G NR access node (e.g., next-generation Node-B (gNB)) to provide 5G service on a carrier (a 5G carrier), and where the service provider has limited licensed spectrum. In that scenario, rather than configuring the 4G eNB and 5G gNB to operate on mutually exclusive carriers, the service provider may configure the access nodes to operate on carriers that overlap partly or fully in frequency with each other.

For instance, the service provider might configure the 5G gNB to operate on a relatively wide-bandwidth 5G carrier, and the service provider might configure the 4G eNB to operate on a narrower-bandwidth 4G carrier that is defined fully within the frequency range of the 5G carrier. Or the service provider might configure the 5G gNB to operate on a 5G carrier of a particular frequency range, and the service provider might configure the 4G eNB to operate on a 4G carrier of a different frequency range that just partially overlaps with the 5G carrier's frequency range. Other examples are possible as well.

In a situation where access nodes operate on carriers that partly or fully overlap with each other so that the carriers share a range of frequency defining a frequency-overlap region, the access nodes could be configured to work with each other in an effort to avoid allocating the same time-frequency air-interface resources as each other. For instance, when one access node is going to allocate resources in the frequency-overlap region, that access node could signal to the other access node to indicate what portion of frequency will be allocated, and the other access node could responsively avoid concurrently allocating resources in that same portion of frequency.

As noted above, the bandwidth of each such carrier could be divided into subcarriers that could be modulated to carry data over the air. Under a representative RAT, a carrier could be configured with particular subcarrier spacing, defining how far apart its subcarriers are from each other. For instance, a carrier might be configured with subcarrier spacing of 15 kHz, meaning that a subcarrier would be defined on the carrier every 15 kHz, or a carrier might be configured with subcarrier spacing of 30 kHz, meaning that a subcarrier would be defined on the carrier every 30 kHz.

One technological challenge with having access nodes provide collocated service on overlapping carriers would arise if the carriers are configured with different subcarrier spacing than each other. In that scenario, a transmission on a subcarrier of one of the carriers may interfere with a transmission on a nearby subcarrier of the other carrier, so the access nodes may need to introduce wasteful guard bands between such transmissions on their respective carriers to help minimize or avoid the impact of that interference.

This problem could arise because, when subcarriers are spaced apart from each other by a particular frequency spacing, N kHz, a transmission on a given one of the subcarriers would have its peak amplitude at that subcarrier and may then decay in a sinusoidal waveform above and below that subcarrier, having zero amplitude every N kHz. If a nearby subcarrier is not spaced by a multiple of N kHz from that given subcarrier, then the decaying sinusoidal waveform from transmission on the given subcarrier would be non-zero at that nearby subcarrier and may therefore interfere with transmission on that nearby subcarrier, possibly creating issues with receipt and decoding of the transmission on that nearby subcarrier.

This problem is unlikely to arise on just a single carrier that has consistent subcarrier spacing throughout its bandwidth, as transmission on each of those subcarriers should be zero amplitude at each other nearby subcarrier. However, if two access nodes operate on carriers with different subcarrier spacing than each other, then there are likely to be instances where the decaying sinusoidal waveforms from transmission on subcarriers of one carrier are not zero amplitude at one or more nearby subcarriers of the other carrier. Therefore, the transmission on each carrier may likely interfere with nearby transmission on the other carrier, which could create issues with receipt and decoding of that nearby transmission on the other carrier.

One way to help address this issue when access nodes will be configured to operate on overlapping carriers with different subcarrier spacing than each other is to introduce guard bands between transmission on one carrier and transmission on the other carrier. For instance, when one access node is going to allocate resources in the frequency-overlap region, that access node could signal to the other access node to indicate what portion of frequency will be allocated, and the other access node could responsively avoid concurrently allocating resources not only within that portion of frequency but also within a defined guard band adjacent to that portion of frequency. In an example implementation where one carrier operates with 15 kHz subcarrier spacing and the other carrier operates with 30 kHz subcarrier spacing, for instance, a guard band of about 180 kHz to 360 kHz might be sufficient to result in acceptable performance.

Unfortunately, however, introducing guard bands like this is undesirable, as each guard band necessarily wastes valuable frequency spectrum. Further, this problem would be magnified if one of the access nodes allocates multiple noncontiguous portions of frequency in the frequency-overlap range, as that could necessitate the introduction of multiple wasteful guard bands within the frequency-overlap range.

The present disclosure provides an improved solution to help address this issue.

In accordance with the disclosure, when access nodes provide collocated service on overlapping carriers with different subcarrier spacing than each other, the access nodes could be configured to cluster their respective concurrent allocation of resources at different respective ends of the frequency-overlap region so as to help maximize frequency width between transmission in the frequency-overlap region on one of the carriers and transmission in the frequency-overlap region on the other carrier.

More generally, at least one of the access nodes in this scenario could be configured to cluster its respective allocation of resources at an end of the frequency-overlap region, and a single guard band could then separate that clustered resource allocation from the remainder of the frequency-overlap region in which the other access node could allocate resources. Or at least one of the access nodes in this scenario could be configured to cluster its respective allocation of resources at an end of the frequency-overlap region opposite from the end at which the other access node would concurrently cluster its respective allocation of resources.

By way of example, if a first access node provides service on a first carrier having a first frequency range and a second access node provides collocated service on a second carrier having a second frequency range that is narrower than but fully within the first frequency range, then the frequency-overlap region may be largely the frequency range of the second carrier. In that scenario, as the access nodes respectively work to allocate PRBs in a given subframe, one of the access nodes could cluster its respective allocation of PRBs at one end of the frequency-overlap region, and the other access node could cluster its respective allocation of PRBs at the other end of the frequency-overlap region.

By so clustering their respective resource allocations separately from each other, the access nodes could help to minimize the extent of the guard bands discussed above. For instance, the access nodes might introduce just a single guard band if necessary between their respective concurrent clusters of resource allocation. But each access node may not need to introduce guard bands between its own respective allocations.

In a representative implementation, without limitation, the access nodes could carry out this process on the uplink. Each example carrier on the uplink may define control channel regions at its high-frequency end and its low-frequency end, with the frequency range between those control channel regions defining an uplink shared-channel region with resource allocable for uplink data communication. With this arrangement, one of the access nodes could cluster its respective uplink resource allocation at one end of the carrier by clustering its resource allocation at one end of the shared-channel region, and the other access node could cluster its respective uplink resource allocation at the other end of the carrier by clustering its resource allocation at the other end of the shared-channel region.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of a network that includes a cell site having a 4G eNB and a 5G gNB configured to provide collocated service on carriers with different subcarrier spacing than each other. It should be understood, however, that the principles disclosed herein could extend to apply in other scenarios as well, such as with respect to other RATs and other access-node arrangements. Further, variations from the specific arrangements and processes described are possible. For instance, various described entities, connections, functions, and other elements could be added, omitted, distributed, re-located, re-ordered, combined, or changed in other ways.

Figure 1:
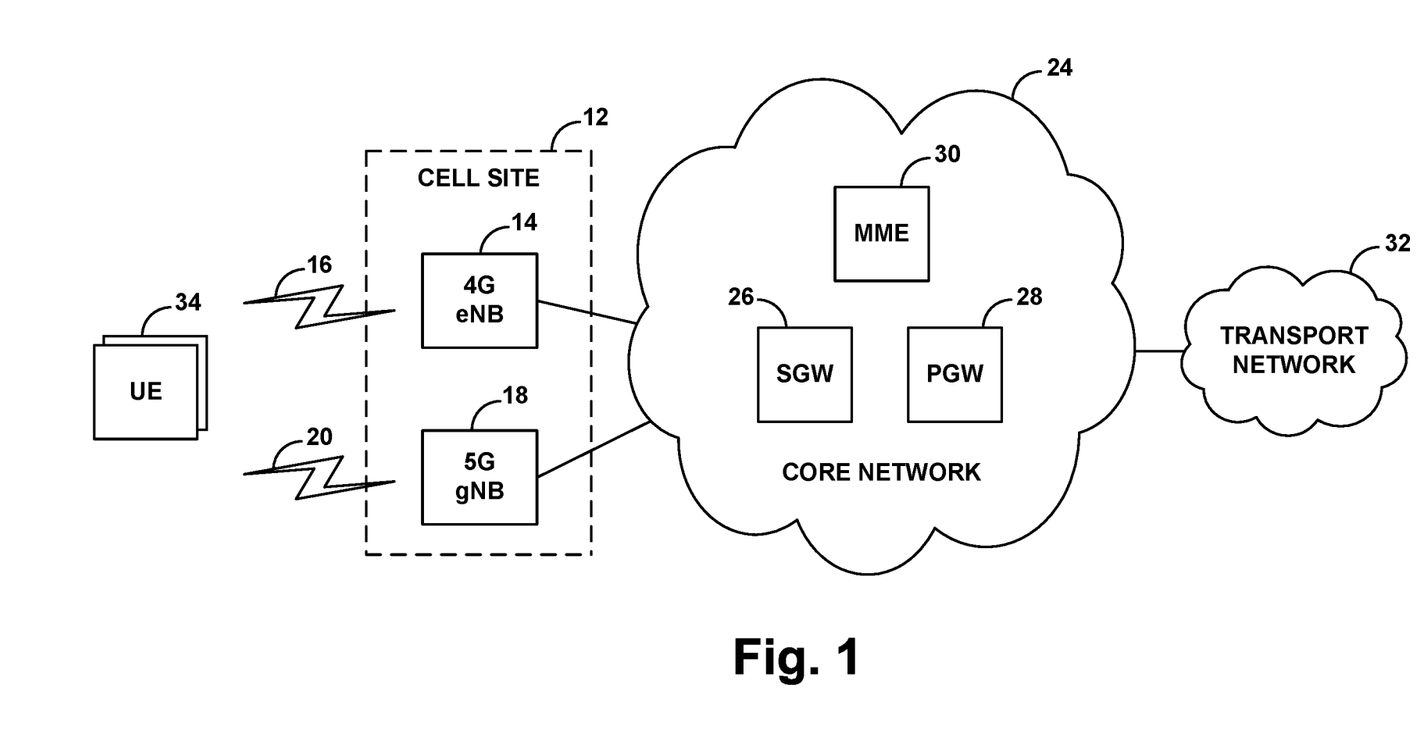
FIG. 1 is a simplified block diagram of an example network.

FIG. 1 depicts an example cell site 12 that includes a 4G eNB 14 that is configured to provide 4G service on a 4G carrier 16, and a 5G gNB 18 that is configured to provide 5G service a 5G carrier 20. These access nodes could be collocated with each other at the cell site (e.g., sharing a common antenna tower and other equipment) and could provide coverage of largely the same direction and geographic scope as each other, to define overlapping coverage in which to serve UEs.

In practice, these illustrated access nodes could be coupled with a common core network or with different respective core networks, which could provide connectivity with one or more transport networks such as the Internet for instance. In the example shown, for instance, the 4G eNB 14 and 5G gNB 18 could be connected with a common core network 24, which could be an Evolved Packet Core (EPC) network or Next Generation Core (NGC) network for instance.

The illustrated core network 24 includes by way of example a serving gateway (SGW) 26, a packet data network gateway (PGW) 28, and a mobility management entity (MME) 30. With this arrangement, each access node could have an interface with the SGW 26, the SGW 26 could have an interface with the PGW 28, and the PGW 28 could provide connectivity with a transport network 32. Further, each access node could have an interface with the MME 30, the MME 30 could have an interface with the SGW 26, and the access nodes could have an interface to engage in signaling with each other. The MME could then operate as a core-network controller, responsible for managing UE mobility and coordinating setup of user-plane bearer connections for carrying UE data traffic through the core network.

In an example implementation, the carriers on which the 4G eNB 14 and 5G gNB 18 operate could take the form described above, among other possibilities. By way of example, the 4G carrier 16 could be FDD or TDD and could thus define separate downlink and uplink frequency channels or a single frequency channel multiplexed over time between downlink and uplink use as described above, and 5G carrier 20 could be TDD, defining a single frequency channel multiplexed over time between downlink and uplink use. Alternatively, other carrier arrangement are possible. In any event, there will likely be recurring instances of time when the 4G carrier and 5G carrier both provide uplink, and recurring instances of time when the 4G carrier and 5G carrier both provide downlink.

As discussed above, the air interface of each such carrier could be divided over time into frames, each frame could be divided over time into subframes, and each subframe could be divided over time into symbol time-segments. And as further discussed above, the bandwidth of each carrier (on the downlink and/or uplink) could divided over frequency into subcarriers having particular subcarrier spacing. Thus, the air interface on a given carrier could define the above-noted array of resource elements, each occupying a particular subcarrier that can be modulated to carry data over the course of a particular symbol time-segment. And in each subframe, these resource elements could be divided over the carrier bandwidth into groups defining the above-noted PRBs, which could be allocable by the associated access node to carry data as needed.

Figure 2:
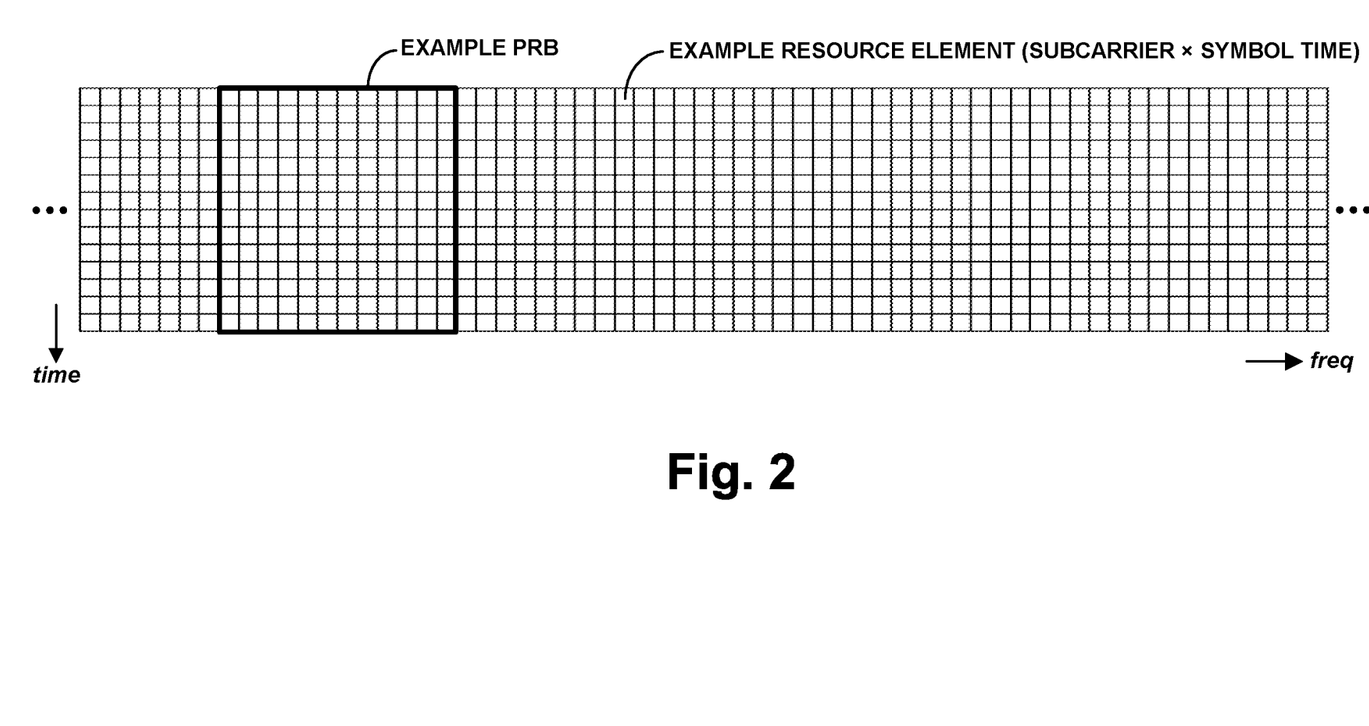
FIG. 2 is an illustration of an example frequency portion of such a carrier in an example subframe.

FIG. 2 depicts an example frequency portion of such a carrier in an example subframe. In this figure, the x-axis represents frequency, the y-axis represents time, and the illustrated grid represents the array of resource elements. Namely, each cell of the grid represents a respective subcarrier (e.g., centered on the x-axis in the grid cell) and a respective symbol time-segment (as the duration of time on the y-axis). In practice, the subcarrier in each such resource element could be modulated using an applicable modulation scheme to carry bits of data. Further, the figure illustrates an example PRB, defined as a group of the resource elements, for carrying data modulated on the subcarriers of those resource elements.

With an example air-interface configuration, some of the resource elements and/or PRBs defined on the carrier may be reserved for special purposes, leaving other resource elements and/or PRBs to be allocated for use to carry data on an as needed basis. For example, on the downlink, the first symbol time-segments per subframe could be reserved for use as a control region to carry control singling from the access node to UEs, and so the allocable PRBs would effectively just span the remaining symbol time segments of the subframe. And on the uplink, the first and last PRBs across the carrier bandwidth could be reserved for use as a control region to carry control signaling from UEs to the access node, and so the allocable PRBs would be just those between in the remainder of the carrier bandwidth those control regions. Further, certain resource elements per subframe could be reserved for other purposes, such as to carry reference signals, synchronization signals, system broadcast messages, and the like.

Figure 3:
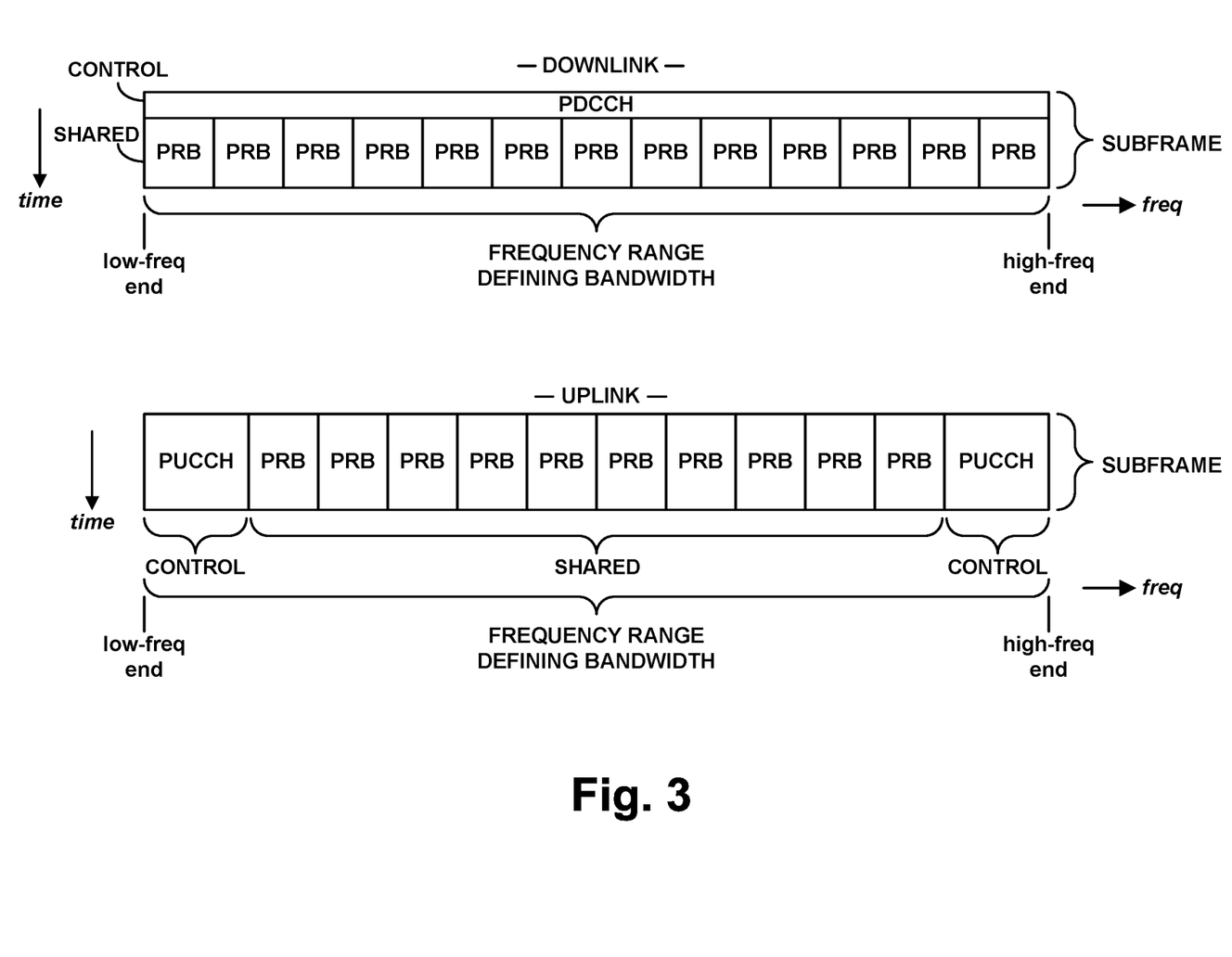
FIG. 3 is an illustration of example downlink and uplink subframes could be configured to define allocable PRBs.

FIG. 3 illustrates generally how example downlink and uplink subframes of such a carrier could thus be configured to define the allocable PRBs relevant for present purposes. As shown in FIG. 3, the downlink and uplink each span a frequency range (shared or respective), defining a carrier bandwidth, from a low-frequency end to a high-frequency end. The downlink and uplink subframes are then each shown divided over frequency into a number of allocable PRBs.

The example downlink subframe is shown generally divided over time into a control region and a shared-channel region as discussed above. The control region, spanning one or more first symbol time-segments of the subframe, defines a physical downlink control channel (PDCCH), for carrying control signaling such as PRB-scheduling directives, from the access node to served UEs. And the shared channel region defines a physical downlink shared channel (PDSCH), divided over frequency into the allocable PRBs in which resource elements could be modulated to carry data from the access node to served UEs.

The example uplink subframe, on the other hand, is shown generally divided over frequency (rather than time) into a control region and a shared-channel region. The control region spans a small number of PRBs at the low-frequency end of the carrier and at the high-frequency end of the carrier, defining a physical uplink control channel (PUCCH) for carrying control signaling such as scheduling requests from UEs to the serving access node. And the shared channel region defines a physical uplink shared channel (PUSCH), divided over frequency into allocable uplink PRBs in which resource elements could be modulated to carry data from UEs to the access node.

Specifics of this air-interface configuration could differ between 4G and 5G (or other applicable RAT). Notably for present purposes, for example, the 4G carrier and 5G carrier could have different subcarrier spacing than each other. Without limitation, for instance, the 4G carrier may have 15 kHz subcarrier spacing, while the 5G carrier may have subcarrier spacing on the order of 30 kHz to 240 kHz. Further, with different subcarrier spacing than each other, the carriers may also have different symbol time-segment durations than each other, which might result in the carriers having different quantities of symbol time-segments per subframe and/or differing from each other in other ways. Other examples are possible as well.

At any given time in the arrangement shown in FIG. 1, a number of UEs 34 may operate within the coverage of 4G eNB 14 and 5G gNB 18. These UEs 34 could take any of the forms noted above, among other possibilities, and could differ in form from each other.

When such a UE enters into coverage of cell site 12, the UE could initially scan for coverage, such by scanning for the presence of a synchronization signal broadcast on one or more known carriers and, upon finding coverage, evaluating reference signal strength to determine whether the coverage is sufficiently strong to support a connection. Upon coverage on a carrier of sufficient strength, the UE could then engage in random-access signaling and Radio Resource Control (RRC) signaling with the access node that provides the coverage, thus putting the UE in an RRC-connected mode.

Once the UE is so connected with the access node, if the UE is not already registered for service with the network, the UE could then engage in an attachment process to register for service. For instance, the UE could transmit to the access node an attach request message, which the access node could forward to the MME 30 for processing. Upon authenticating and authorizing the UE for service, the MME and access node could then coordinate setup for the UE of at least one user-plane bearer, which could include an access bearer portion extending between the access node and the PGW 28 via the SGW 26 and a data radio bearer portion extending over the air between the access node and the UE. And the access node could store a context record indicating service state and service-profile information for the UE.

The access node could then proceed to provide the UE with wireless data communication service.

For instance, when data arrives at the access node over the access bearer for transmission to the UE, the access node could select and allocate one or more downlink PRBs in a subframe for use to transmit at least a portion of the data, defining a transport block, to the UE. The access node could then transmit to the UE in the PDCCH of that subframe a Downlink Control Information (DCI) message that designates the downlink PRBs, and the access node could accordingly transmit the transport block to the UE in those designated downlink PRBs.

And when the UE has data to transmit to the access node (e.g., for transmission on the transport network 32), the UE could transmit to the access node a scheduling request that carries with it a buffer status report (BSR) indicating how much data the UE has buffered for transmission. And in response, the access node could select and allocate one or more uplink PRBs in an upcoming subframe for carrying a transport block of that data from the UE and could transmit to the UE (in a DCI on the downlink) a DCI message that designates those upcoming uplink PRBs. The UE could then accordingly transmit the transport block to the access node in the designated uplink PRBs.

In an example implementation, the downlink PRBs that the access node allocates to a given UE in a subframe may or may not be contiguous with each other (i.e., adjacent to each other in frequency). But the uplink PRBs that the access node allocates to a UE in a subframe will be contiguous with each other—to help facilitate efficient uplink transmission by the UE, for instance.

Note also that the some or all of the UEs 34 may also support dual-connectivity service, in which they would be served concurrently over a connection with the 4G eNB 14 and a connection with the 5G gNB, so as to benefit from increased peak data rate of communication. With 4G and 5G, this dual connectivity might be EUTRA-NR Dual Connectivity (EN-DC), which may involve the UE first connecting with the 4G eNB 14 and the 4G eNB 14 then coordinating setup for the UE of a secondary connection with the 5G gNB. Once the UE is so connected with both access nodes, the access nodes may then each serve the UE in the manner noted above.

As noted above, the present disclosure addresses a scenario where there is a frequency overlap between two carriers and where the carriers are configured with different subcarrier spacing than each other, and the disclosure provides a mechanism to help facilitate efficiency in air-interface-resource allocation with that frequency-overlap region. For simplicity, the remainder of this description will walk through an implementation with respect to uplink frequency overlap and resource allocation. But it should be understood that similar principles could be applied on the downlink.

Figure 4:
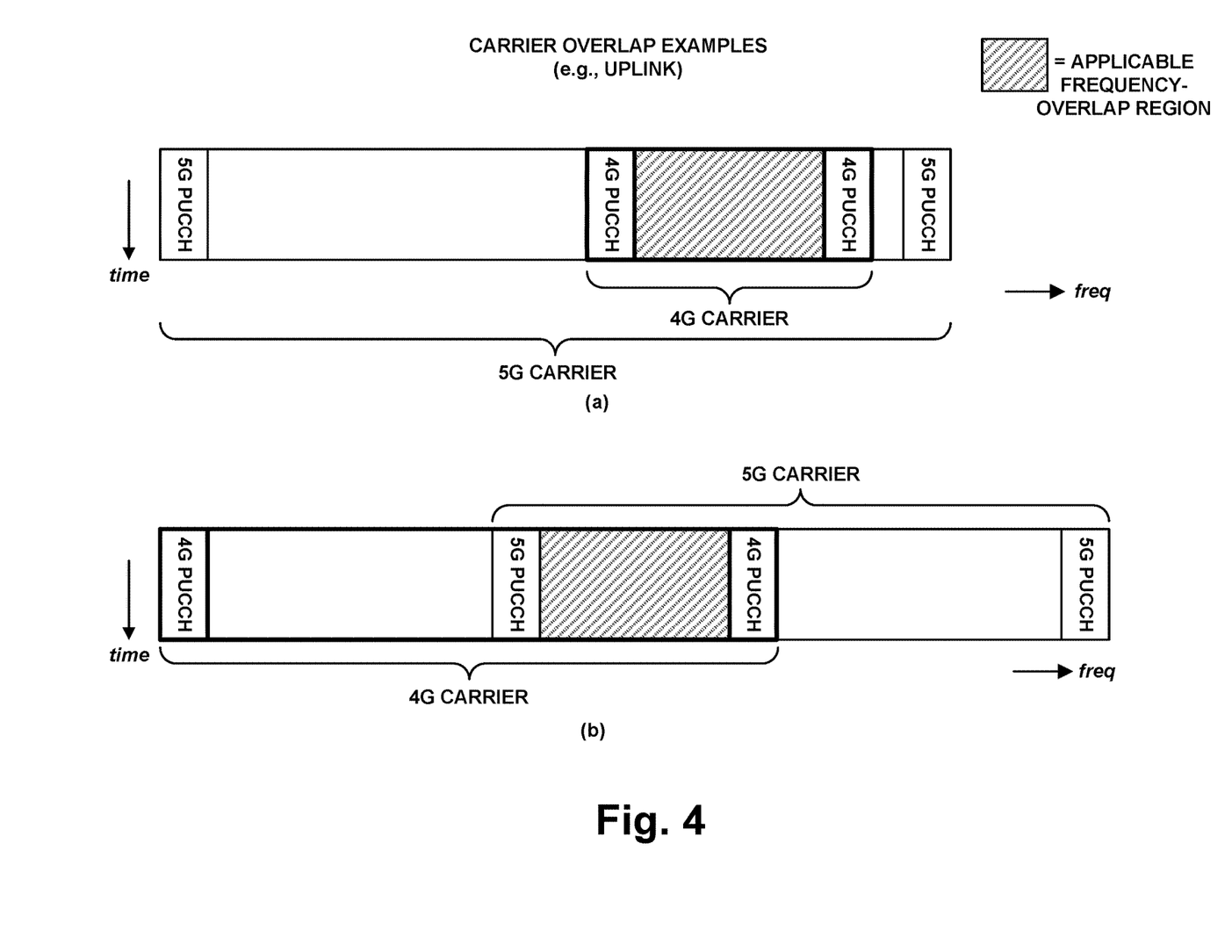
FIG. 4 is an illustration of example frequency overlap scenarios in a given time interval.

FIG. 4 depicts two of various possible examples of how 4G carrier 16 and 5G carrier 20 could overlap with each other within a given time interval (such as a given subframe or other interval), so as to define an example frequency-overlap region.

FIG. 4(*a*) shows the 5G carrier 20 as having a relatively wide frequency range and the 4G carrier 16 having a frequency range that is narrower and that is defined fully within the frequency range of the 5G carrier. As shown, each of these carriers has a PUCCH defined at its low-frequency end and its high-frequency end, so the intervening frequency on each carrier would then define a PUSCH of the carrier. With this arrangement, a relevant frequency-overlap region is the frequency range of the 4G carrier's PUSCH, as that frequency range defines 4G PRBs allocable by the 4G eNB 14 and also defines 5G PRBs allocable by the 5G gNB 18.

FIG. 4(*b*) shows the 4G carrier 16 and 5G carrier 20 overlapping just partly, with a high-frequency portion of the 4G carrier 16 overlapping with a low-frequency portion of the 5G carrier 20. Here as well, each carrier is shown with a PUCCH defined at its low-frequency end and its high-frequency end, so that the intervening frequency on each carrier would define a PUSCH of the carrier. With this arrangement, the relevant frequency-overlap region is the frequency range from the 5G carrier's low-end PUCCH to the 4G carrier's high-end PUCCH, as that frequency range defines 4G PRBs allocable by the 4G eNB 14 and also defines 5G PRBs allocable by the 5G gNB 18.

As noted above, a technological problem arising from the fact that the 4G carrier 16 and 5G carrier 20 have different subcarrier spacing than each other is that the 4G eNB 14 and 5G gNB 18 may need to apply wasteful guard bands between their respective allocations of resources in the frequency region, to help minimize or avoid the interference described above for instance.

Figure 5:
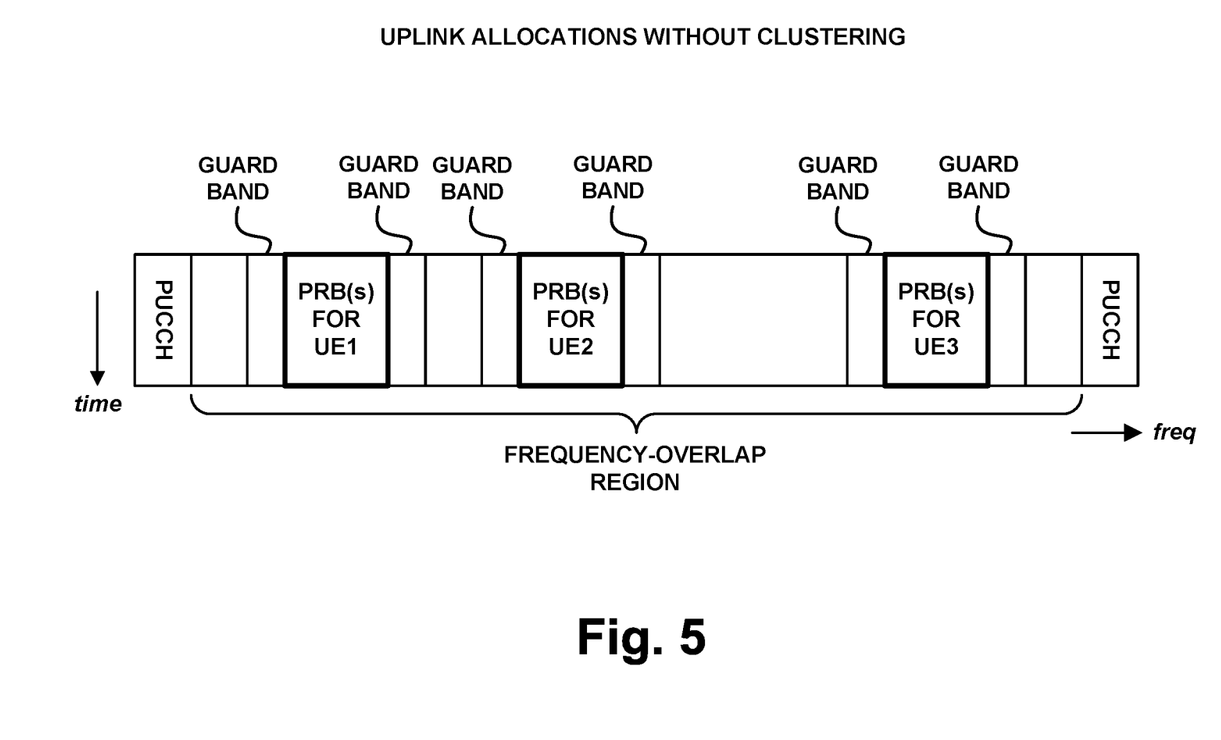
FIG. 5 is an illustration of how PRB allocations spaced in frequency when faced with use of different subcarrier spacing on carriers in the frequency-overlap region could necessitate application of numerous guard bands.

FIG. 5 illustrates this technological problem by way of example. Namely, FIG. 5 illustrates example PRB allocations that the 4G eNB 14 might schedule on the 4G carrier in the frequency-overlap region of an example time interval. Here, uplink PRB allocation for each UE could be an allocation of one uplink PRB or an allocation of multiple PRBs that are contiguous with each other. But as shown, the PRB allocations for representative UEs 1, 2, and 3 are not contiguous with each other. Therefore, the 4G eNB 14 and 5G gNB 18 may need to apply guard bands on each frequency side of each 4G uplink PRB allocation, to help minimize or avoid the interference described above. For instance, the access nodes could engage in signaling with each other to coordinate application of these guard bands. In the example arrangement of FIG. 5, this would result in six guard bands introduced in the frequency overlap region.

Figure 6:
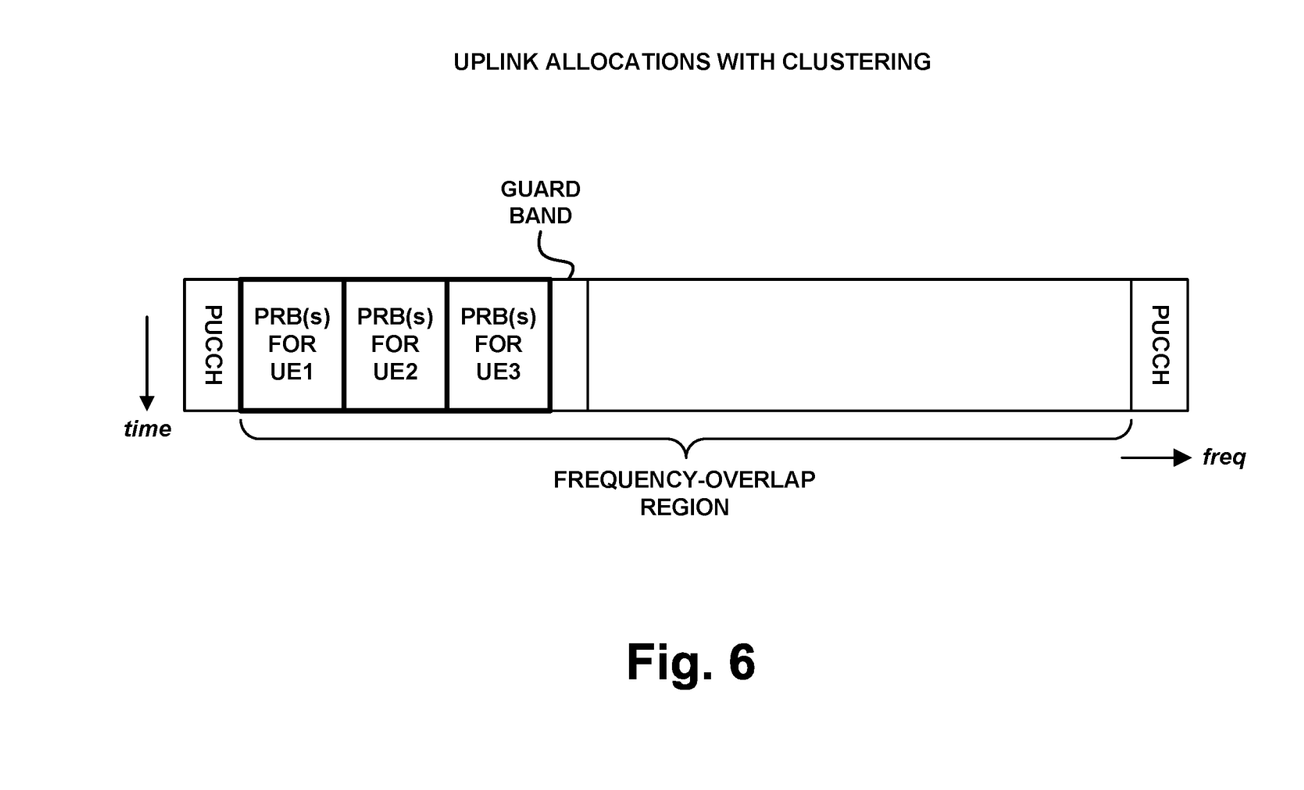
FIG. 6 is an illustration of example improved resource allocation with PRBs clustered at an end of the frequency-overlap region.

FIG. 6 next illustrates an improved resource allocation arrangement may could help to minimize the extent to which guard bands needs to be applied and may therefore allow more efficient use of valuable RF frequency spectrum in the frequency-overlap region.

As shown in FIG. 6, the 4G eNB 14 could optimally cluster its uplink PRB allocations at a frequency end of the frequency-overlap region, such as next to a PUCCH at one end of the frequency-overlap region if applicable. Clustering the uplink PRB allocations involves arranging the PRB allocations to be contiguous with each other (or largely contiguous with each other but still serving the present purpose). As shown in FIG. 6, for instance, the example PRB allocations for representative UEs 1, 2, and 3 are clustered at the low end of the frequency-overlap region (but could just as well be clustered at the high end of the frequency-overlap region). Optimally with this arrangement, merely one guard band next to the contiguously clustered 4G PRB allocations to the UEs could suffice to separate the 4G resource allocations from 5G resource allocations in the frequency-overlap region. Therefore, this clustering could help to minimize the extent of RF frequency spectrum wasted by application of guard bands.

Note that in an alternative implementation, the 4G eNB 14 could cluster its 4G PRB allocations at a position in the frequency-overlap region other than at an end of the frequency-overlap region. Doing so may necessitate application of two guard bands, one to each side of the contiguous cluster of PRB allocations. But that may still be better than if the individual PRB allocations were not clustered together. Other variations are possible as well.

Further, note that having the clustered 4G PRB allocations be directly adjacent in frequency to a PUCCH of the 5G carrier that uses different subcarrier spacing than the 4G carrier uses may be acceptable if transmissions in the 5G PUCCH use a low-order modulation scheme that is more robust and sufficiently able to withstand interference that could result from the adjacent 4G transmissions. Alternatively, it may be useful to add a guard band between the clustered 4G PRB allocations and the 5G PUCCH.

In an example implementation, the 4G eNB 14 could cluster its 4G PRB allocations at one end of the frequency-overlap region as discussed above and could signal to the 5G gNB 18 to inform the 5G gNB 18 of that frequency portion of the frequency-overlap region that the 4G eNB 14 is allocating. In response, the 5G gNB 18 could then safely proceed to limit it 5G PRB allocations to be within the remainder of the frequency-overlap region except for a guard band next to the clustered 4G PRBs.

Figure 7:
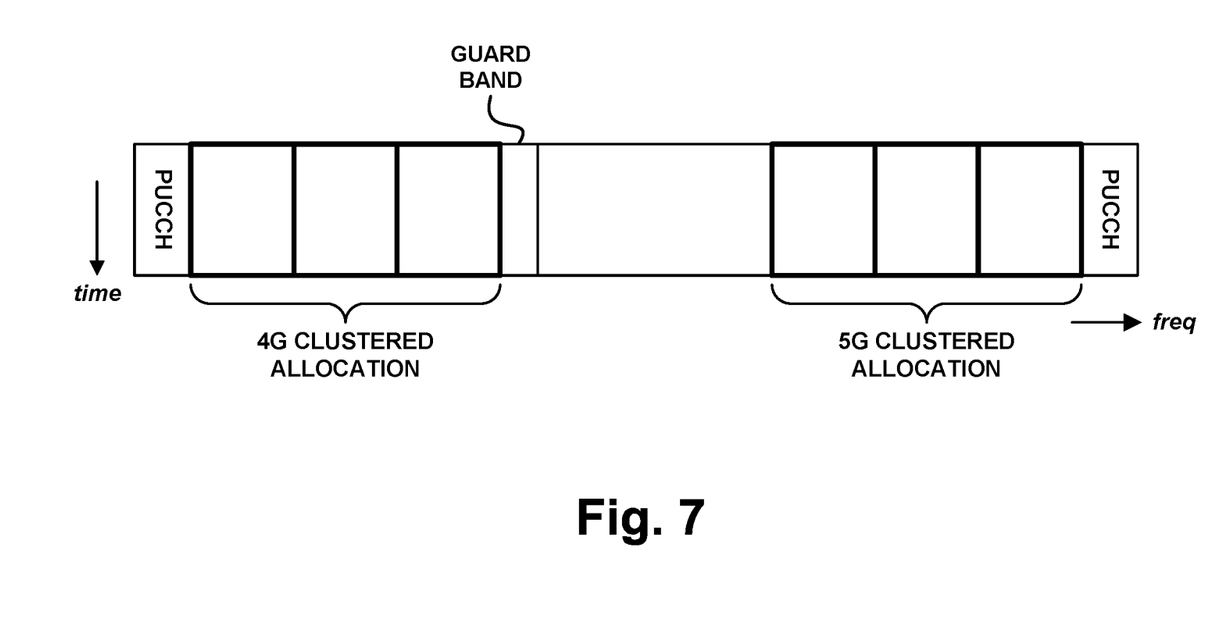
FIG. 7 is an illustration of an example improved resource allocation in which PRBs with one subcarrier spacing are contiguously clustered at one end of the frequency-overlap region and PRBs with another subcarrier spacing are contiguously clustered at an opposite end of the frequency-overlap region.

Further, in response to the 4G eNB's clustering of the 4G PRBs at one end of the frequency-overlap region, the 5G gNB 18 could specifically cluster its 5G PRB allocations at the other (opposite) end of the frequency-overlap region, to help maximize efficiency and frequency-distance between the 4G transmissions using one subcarrier spacing and the 5G transmissions using a different subcarrier spacing. FIG. 7 illustrates this result by way of example, showing clustered 4G PRB allocations at a low end of the frequency-overlap region an clustered 5G PRB allocations at the opposite, high end of the frequency-overlap region.

Note that these principles could also be applied in reverse between 5G and 4G, with the 5G gNB 18 clustering its 5G PRB allocation and informing the 4G eNB 14, and the 4G eNB 14 responsively limiting its 4G PRB allocation to a safe remainder of the frequency-overlap region, possibly clustered at the other end of the region. Further, in another implementation, the 4G eNB 14 and/or 5G gNB 18 could be preconfigured to cluster their respective PRB allocations each at a different respective end of the frequency-overlap region, which may avoid a possible need for the access nodes to inform each other of their plan to do so. Though the access nodes may still need to share with each other the extent to which they are allocating resources, to avoid having them allocate the same resources as each other for instance.

In addition, note that if the above described implementation is applied on the downlink where a set of downlink PRBs allocated to an individual UE may or may not be contiguous with each other, it could be further beneficial for the access node at issue to make those PRBs allocated to an individual UE be contiguous with each other, to further avoid a possible need for guard bands between those PRBs.

Figure 8:
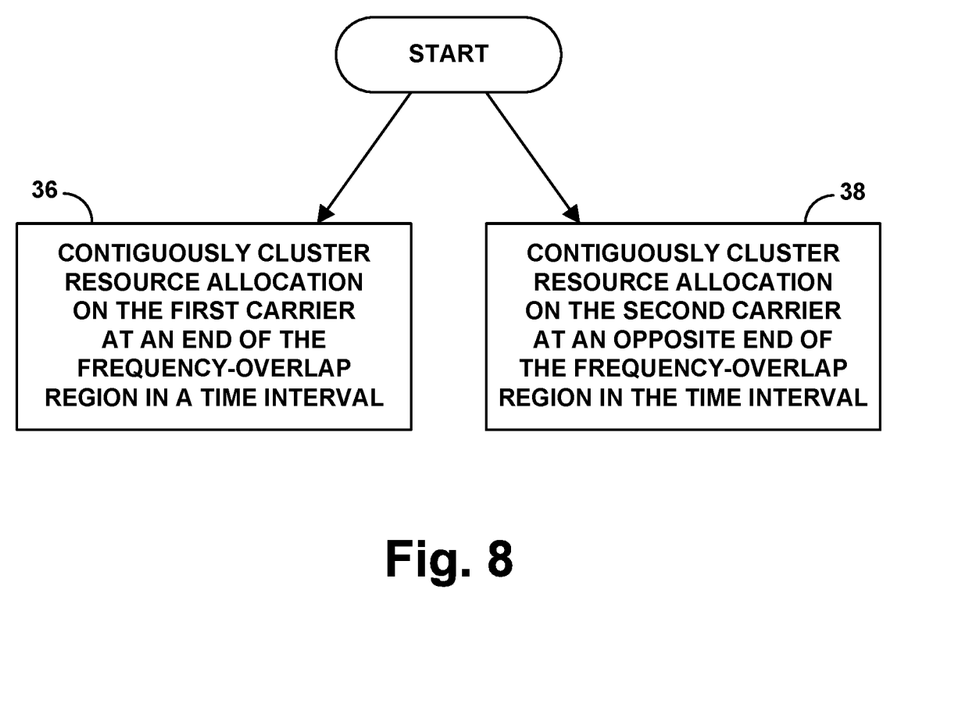
FIG. 8 is a flow chart depicting an example method in accordance with the present disclosure.

FIG. 8 is a flow chart a method that can be carried out in accordance with the present disclosure, to control air-interface resource allocation in a frequency-overlap region that defines a range of frequency encompassed by both (i) a first carrier having first subcarrier spacing and (ii) a second carrier having second subcarrier spacing different than the first subcarrier spacing. As shown in FIG. 8, at block 36, the method includes contiguously clustering resource allocation on the first carrier at an end of the frequency-overlap region in a time interval. And at block 38, the method includes contiguously clustering resource allocation on the second carrier at an opposite end of the frequency-overlap region in the time interval.

As discussed above, the act of contiguously clustering resource allocation on the first carrier at the end of the frequency-overlap region could be carried out by a first access node that provides service on the first carrier, and could involve contiguously clustering, at the end of the frequency-overlap region, resource allocations for multiple served devices. Likewise, the act of contiguously clustering resource allocation on the second carrier at the opposite end of the frequency-overlap region could be carried out by a second access node that provides service on the second carrier that is collocated with the service on the first carrier, and could involve contiguously clustering, at the opposite end of the frequency-overlap region, resource allocations for multiple served devices.

Further, the act of the second access node contiguously clustering resource allocation on the second carrier could be carried out in response to the contiguous clustering by the first access node. For instance, the first access node could signal to the second access node to notify the second access node of the first access node's contiguous clustering, and based at least part on that notification, the second access node could carry out the contiguous clustering on the second carrier.

As further discussed above, the first carrier could be a 4G LTE carrier and the second carrier could be a 5G NR carrier, or vice versa, among other possibilities. Further, the time interval at issue could be a subframe or other time interval when concurrent resources would be used on the two carriers within the frequency-overlap region, such as for uplink resource allocation for instance.

In addition, as discussed above, this method could be carried out in response to the first and second carriers having different subcarrier spacing than each other in the frequency-overlap region. For instance, due to the first and second carriers using different subcarrier spacing than each other, a wireless service provider could configure the first and second access nodes to carry out the operations of the method so as to help minimize the need for guard bands between transmission on the first carrier using the first subcarrier spacing and transmission on the second carrier using the second subcarrier spacing. With this arrangement, for instance, the method could then involve applying just a single guard band between the contiguously clustered resource allocation on the first carrier and the contiguously clustered resource allocation on the second carrier, as shown in FIG. 7 for instance.

Consistent with the above discussion, the present disclosure also contemplates a wireless communication system including a first access node configured to provide first service on a first carrier and a second access node configured to provide second service on a second carrier. As discussed above, the first service and second service could be collocated with each other, the first carrier and second carrier could overlap in frequency with each other to define a frequency-overlap region, and the first carrier could have first subcarrier spacing and the second carrier could have second subcarrier spacing different than the first subcarrier spacing. In that arrangement, the first access node could be configured to contiguously cluster resource allocation on the first carrier at an end of the frequency-overlap region in a time interval, and the second access node could be configured to contiguously cluster resource allocation on the second carrier at an opposite end of the frequency-overlap region in the time interval.

Various features discussed above can be implemented in this context as well, and vice versa.

Figure 9:
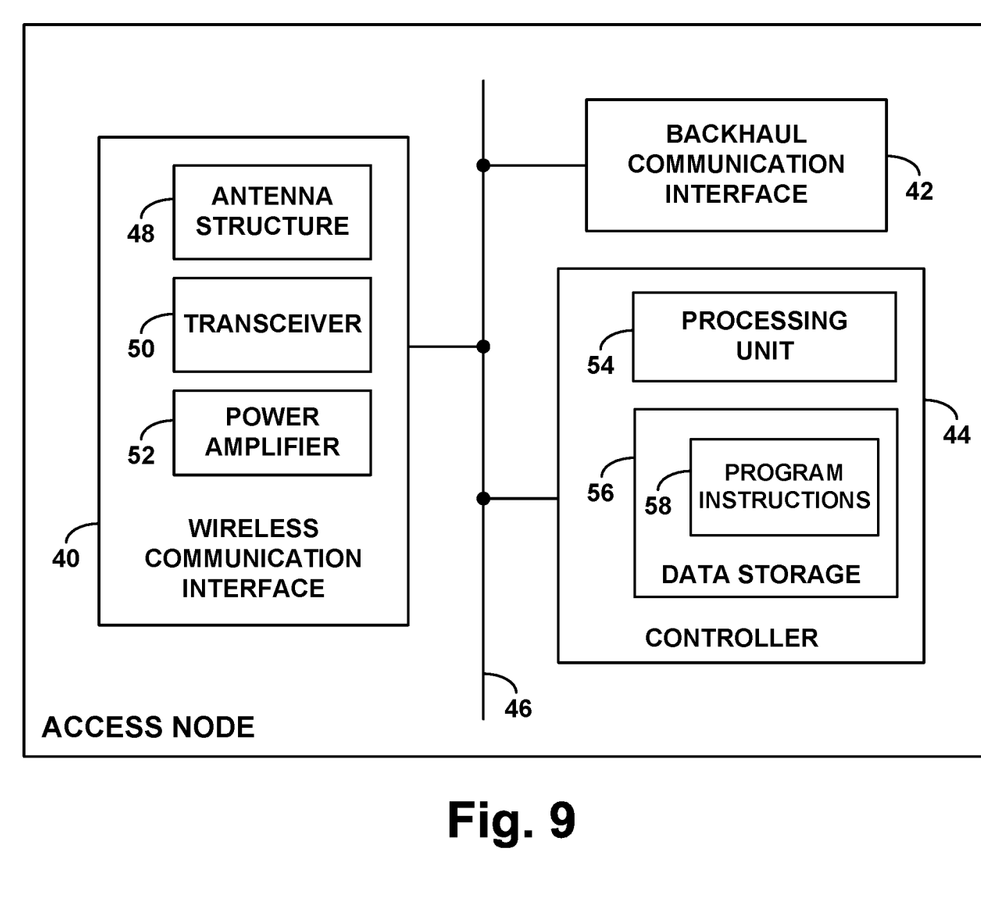
FIG. 9 is a simplified block diagram of an example access node that could be configured to operate in accordance with the disclosure.

Finally, FIG. 9 is a simplified block diagram of an example access node that could be configured to operate as either of the access nodes described above. As shown in FIG. 9, the access node incudes a wireless communication interface 40, a backhaul interface 42, and a controller 44, all of which could be integrated together in various ways or interconnected by a system bus, network, or other connection mechanism 46.

The wireless communication interface 40 could include a radio 48, a power amplifier 50, and an antenna structure 52, cooperatively enabling the access node to transmit and receive as described above so as to engage in air-interface communication on a carrier. And the backhaul interface 42 could comprise a network port through which the access node could communicate on a core network and/or with one or more other entities, including one or more access nodes for instance Controller 44 could then comprise a processing unit 54 (e.g., one or more microprocessors), non-transitory data storage 56 (e.g., one or more volatile and/or non-volatile storage components), and program instructions 58 (e.g., machine language instructions) stored in the data storage 56 and executable by the processing unit 54 to carry out various access-node operations described herein.

In an example implementation, the arrangement of FIG. 9 could represent a first access node, with the wireless communication interface facilitating air-interface communication on a first carrier. And the controller could be configured to control allocation of air-interface resources on the first carrier when the first access node provides service on the first carrier using first subcarrier spacing and a second access node provides collocated service on a second carrier using second subcarrier spacing different than the first subcarrier spacing, with the first carrier overlapping in frequency with the second carrier to define a frequency-overlap region.

For instance, the controller could be configured to contiguously cluster air-interface resource allocation on the first carrier within the frequency-overlap region, to help minimize guard-band use between transmission on the first carrier within the frequency-overlap region and transmission on the second carrier within the frequency-overlap region. By way of example, the controller could include a PRB scheduler program module that controls allocation of PRBs on the first carrier, and that PRB scheduler could be executable to control allocation of PRBs on the first carrier so as to contiguously cluster PRB allocations to multiple UEs at a given end of the frequency-overlap region.

Further, the controller could be configured to notify the second access node (e.g., through inter-access-node signaling) of what portion of frequency in the overlapping-frequency region the first access node is allocating, so as to enable the second access node to avoid concurrently allocating air-interface resources within that portion of frequency and within a defined guard band next to that portion of frequency.

The present disclosure also contemplates one or more instances of computer readable medium having stored thereon program instructions executable by a processing unit to carry out various operations described.

Exemplary embodiments have been described above. Those skilled in the art will understand, however, that changes and modifications may be made to these embodiments without departing from the true scope and spirit of the invention.

We claim:

1. A method for controlling air-interface resource allocation in a frequency-overlap region defining a range of frequency that is encompassed by both (i) a first carrier having first subcarrier spacing and (ii) a second carrier having second subcarrier spacing different than the first subcarrier spacing, the method comprising:
contiguously clustering resource allocation on the first carrier at an end of the frequency-overlap region in a time interval; and
contiguously clustering resource allocation on the second carrier at an opposite end of the frequency-overlap region in the time interval.

2. The method of claim 1,
wherein contiguously clustering resource allocation on the first carrier at the end of the frequency-overlap region is carried out by a first access node that provides service on the first carrier and comprises contiguously clustering at the end of the frequency-overlap region resource allocations for multiple served devices, and
wherein contiguously clustering resource allocation on the second carrier at the opposite end of the frequency-overlap region is carried out by a second access node that provides service on the second carrier, collocated with the service on the first carrier, and comprises contiguously clustering at the opposite end of the frequency-overlap region resource allocations for multiple served devices.

3. The method of claim 2, wherein the contiguously clustering by the second access node is carried out in response to the contiguously clustering by the first access node.

4. The method of claim 1, wherein the first carrier is a 4G LTE carrier and the second carrier is a 5G NR carrier.

5. The method of claim 1, wherein the time interval is a subframe.

6. The method of claim 1, wherein the method is carried out in response to the first and second carriers having different subcarrier spacing than each other in the frequency-overlap region.

7. The method of claim 1, wherein the method is carried out for uplink resource allocation.

8. The method of claim 1, further comprising applying a single guard band between the contiguously clustered resource allocation on the first carrier and the contiguously clustered resource allocation on the second carrier.

9. A wireless communication system comprising:
a first access node configured to provide first service on a first carrier; and
a second access node configured to provide second service on a second carrier, wherein the first service and second service are collocated with each other, wherein first carrier and second carrier overlap in frequency with each other to define a frequency-overlap region, and wherein the first carrier has first subcarrier spacing and the second carrier has second subcarrier spacing different than the first subcarrier spacing,
wherein the first access node is configured to contiguously cluster resource allocation on the first carrier at an end of the frequency-overlap region in a time interval, and
wherein the second access node is configured to contiguously cluster resource allocation on the second carrier at an opposite end of the frequency-overlap region in the time interval.

10. The wireless communication system of claim 9,
wherein contiguously clustering resource allocation on the first carrier at the end of the frequency-overlap region comprises contiguously clustering at the end of the frequency-overlap region resource allocations for multiple served devices, and
wherein contiguously clustering resource allocation on the second carrier at the opposite end of the frequency-overlap region comprises contiguously clustering at the opposite end of the frequency-overlap region resource allocations for multiple served devices.

11. The wireless communication system of claim 10, wherein the contiguously clustering by the second access node is carried out in response to the contiguously clustering by the first access node.

12. The wireless communication system of claim 9, wherein the first carrier is a 4G LTE carrier and the second carrier is a 5G NR carrier.

13. The wireless communication system of claim 9, wherein the time interval is a subframe.

14. The wireless communication system of claim 9, wherein the contiguous clustering by the first access node and contiguously clustering by the second access node are carried out for uplink resource allocation.

15. A first access node comprising:
a wireless communication interface including an antenna structure through which to engage in air-interface communication on a first carrier;
a backhaul interface through which to communicate on a core network; and
a controller configured to control allocation of air-interface resources on the first carrier when the first access node provides service on the first carrier using first subcarrier spacing and a second access node provides collocated service on a second carrier using second subcarrier spacing different than the first subcarrier spacing, wherein the first carrier overlaps in frequency with the second carrier to define a frequency-overlap region, wherein the controller is configured to contiguously cluster air-interface resource allocation on the first carrier within the frequency-overlap region, to help minimize guard-band use between transmission on the first carrier within the frequency-overlap region and transmission on the second carrier within the frequency-overlap region.

16. The first access node of claim 15, wherein the contiguous clustering is at an end of the frequency-overlap region.

17. The first access node of claim 15, wherein the first carrier is a 4G LTE carrier and the second carrier is a 5G NR carrier.

18. The first access node of claim 15, wherein the controller carries out the contiguous clustering of air-interface resource allocation for uplink communication.

19. The first access node of claim 15, wherein the controller is further configured to notify the second access node of what portion of frequency in the overlapping-frequency region the first access node is allocating, to enable the second access node to avoid concurrently allocating air-interface resources within that portion of frequency and within a defined guard band next to that portion of frequency.

20. The first access node of claim 15, wherein the controller comprises a processing unit, non-transitory storage, and program instructions stored in the non-transitory storage and executable by the processing unit to carry out the contiguously clustering.

\* \* \* \* \*